United States Patent
Roberts et al.

(10) Patent No.: US 6,654,958 B1
(45) Date of Patent: Nov. 25, 2003

(54) REFERENCE SIGNAL GENERATOR FOR RETURN PATH ALIGNING

(75) Inventors: Douglas K. Roberts, Manlius, NY (US); Gary F. Chandler, Chittenango, NY (US); Horacio G. Facca, Fayetteville, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/156,932

(22) Filed: Sep. 18, 1998

Related U.S. Application Data
(60) Provisional application No. 60/069,798, filed on Dec. 16, 1997.

(51) Int. Cl.[7] .......................... H04N 7/173; H04N 7/16; H04J 14/02; H04B 10/00; H04B 17/00

(52) U.S. Cl. .................. 725/129; 725/105; 725/117; 725/143; 725/144; 725/149; 359/125; 359/161; 455/67.4

(58) Field of Search .................. 455/67.4, 14, 523, 455/69, 71; 359/125, 187, 146–148, 154, 167; 372/29.01, 29.011, 29.014, 29.015; 725/105, 107, 127–131, 149, 121, 33

(56) References Cited

U.S. PATENT DOCUMENTS

| | | | | |
|---|---|---|---|---|
| 5,260,778 A | * | 11/1993 | Kauffman et al. | 725/33 |
| 5,559,624 A | * | 9/1996 | Darcie et al. | 359/125 |
| 5,606,725 A | * | 2/1997 | Hart | 725/131 |
| 5,710,653 A | * | 1/1998 | Memecek et al. | 359/187 |
| 6,118,565 A | * | 9/2000 | Frigo | 359/167 |
| 6,262,997 B1 | * | 7/2001 | Quayle | 370/503 |

FOREIGN PATENT DOCUMENTS

DE     3223338 A1    5/1984      H03B/5/04

* cited by examiner

*Primary Examiner*—Andrew Faile
*Assistant Examiner*—Hai V. Tran
(74) *Attorney, Agent, or Firm*—Daniel J. Piotrowski

(57) ABSTRACT

A CATV system is provided that includes a head-end with laser transmitters to provide data to a multitude of nodes through a forward optical network tree. The nodes convert the optical signals into electrical signals and retransmit the television and data signals through a coaxial network tree to customer interface units (CIUs). The nodes include respective controllers which identify status signals from the equipment of the nodes and transmit the status signals and a reference signal to the head-end controller for display on a display of the head-end controller. The reference signal allows monitoring that the return optical transmitter and network are operating correctly and allows the return signals from the nodes to be aligned. The status signals from the nodes include laser operation, laser bias current and laser power output for the laser transmitters of the nodes.

19 Claims, 11 Drawing Sheets

REFERENCE SIGNAL GENERATOR FOR RETURN PATH ALIGNING

This application claims the benefit of Provisional application Ser. No. 60/069,798, filed Dec. 16, 1997.

FIELD OF THE INVENTION

These inventions relate to interactive cable antenna television (CATV) systems (also known as broadband networks) for distributing television programs, radio programs, and data (e.g. equipment control commands, equipment status information, telephone data, and computer data) through a cable network to customers and for receiving data through the cable network back from customers. In such systems optical information signals including programs and data are distributed through an optical cable network or tree from a head-end to local nodes and customer return information signals including data are collected through another optical cable network or tree from the local nodes back to the head-end. More specifically, the invention is related to the status and control signals used for operating such a system in an efficient manner.

BACKGROUND OF THE INVENTION

In a modern CATV system, lasers are used for converting electrical signals into optical signals which are transmitted through optical cables. Also, photo detectors such as photo diodes are used for converting optical signals into electrical signals to receive the signals from the optical cables. Prior to electrical to optical conversion, the electrical signals need to be amplified with carefully controlled gain in order for the laser to provide the maximum available bandwidth and to minimize error rates. Also, after optical to electrical conversion, the electrical signals need to be amplified for transmission through a coaxial cable network.

At the head-end of a CATV system a coaxial cable network provides electrical signals including a multitude of television program streams and data streams (such as telephone calls, equipment control commands, and computer data) which are combined together into a forward information stream which is used to modulate a laser for transmitting the information stream through a forward optical cable network as an optical signal for distribution to a multitude of nodes. At the nodes the optical signal is used to modulate the current through an photo detector to convert the optical signal into a forward electrical signal.

The forward electrical signal is transmitted from the nodes through a local coaxial cable network to a multitude of customer interface units (CIUs). The CIUs provides the forward information signals to television, telephone, and computer equipment, and receive return data streams from the telephone and computer equipment. The CIUs transmit the return signals back through the coaxial cable network to the nodes. The nodes include diplexers to separate the return signals out from the forward signals. The nodes use the separated return signals to modulate a return laser for transmitting the return data stream through a return optical cable network as an optical signal to the head-end. The head-end provides the return signals to telephone and computer equipment at the head-end.

In CATV systems there are stringent requirements for minimum signal strength, minimum signal to noise ratio, and maximum signal distortion at the CIUs. These requirements effectively limit the distance that the customers can be serviced through the CATV system. Noise and distortions are inherent in the laser transmitters and these limit the power of the lasers and frequencies used for optical transmission. Rayleigh back scattering is due to localized variations in the density of the optical fibers and additional back scattering is due to components in the optical cable such as connectors, optical isolators, splices, and detectors which reflect light. Back scattering and reflection result in light traveling back into the laser and tends to modulate the laser and to interfere with the transmitted light which results in noise. In the optical cable, light is absorbed so that the signal strength attenuates with distance (typically about 0.4 db per km). The optical detectors of the receivers continually produce random noise which is mixed with the weakened signal so that signal to noise ratio is further reduced. Currently in analog systems, optical cable lengths are limited to approximately 50 miles due to these reductions in the signal to noise ratio.

In the coaxial portion of the system, random noise is introduced by the CIUs and also by leakage from external electromagnetic signal sources into the cables. Amplifiers are provided in the coaxial system if required to maintain a high signal strength in remote parts of the coaxial system, so that the effects of this random noise on signal strength to noise ration is limited. However the amplifiers add to the noise. The noise due to the optical portion of the transmission and the noise due to the coaxial portion of the system are combined in the signal and the signal has to meet the stringent signal to noise requirements described above.

Those skilled in the art are referred to U.S. Pat. No. 5,435,868 to Blauvelt.

The above citations are hereby incorporated herein in whole by reference.

SUMMARY OF THE INVENTION

A node of a CATV system includes apparatus for providing a reference signal and the head-end of the CATV system includes apparatus to allow the presence of the reference signal to be detected. The reference signal provider and detector allow the correct operation of the return paths from the nodes to the head-end to be verified. The head-end includes measurement apparatus to allow the strength of the reference signal to be determined and the signal strength of the return signal to be adjusted at the head-end so that the signal strength of all the return paths are made approximately equal (they are aligned). Control apparatus of the head-end includes software to automatically align the return signal path by sending control signals to the optical receivers of the head-end which include controllable gain adjustment apparatus.

The head-end control apparatus includes software for providing control signals to the nodes including signals for turning on and turning off the reference signal provider and the nodes include control apparatus for detecting the control signals and turning the reference signal provider on and off depending on the control signals from the head-end. The head-end control apparatus includes user input means for selecting a node or nodes and for addressing or specifically routing the control signals from the head-end to only the selected node or nodes. In order to verify the correct operation of both the forward and return information networks, the head-end controller is programmed for selecting a node, sending a command to change the reference signal (turn the reference signal of the selected node on or otherwise changing the signal in such a way that the change can be automatically detected) and detecting the presence of the reference signal. In addition, the head-end control apparatus includes programmed apparatus for providing control signals to control the amplitude and/or frequency of the reference signal; the node control apparatus of the head-end is adapted for controlling the amplitude of the reference signal and/or the frequency of the reference signal depending on the control signals from the head-end control apparatus; and the head end includes apparatus for automatically detecting the presence, amplitude and frequency of the reference signal.

The control apparatus of the head-end includes programmed apparatus for requesting status information about node equipment. The node includes monitoring apparatus for detecting the status of various equipment within the node such as the bias current of the laser transmitter, the output power of the laser transmitter, faulted conditions of the laser transmitter. The monitoring apparatus generates monitor status signals indicating the status of the equipment in the node which are transmitted to the node control apparatus, and the node control apparatus sends node status signals to the head-end control apparatus depending on the monitor status signals and status query command signals.

The head-end controller may include a user interface including a keyboard and mouse for user input and a display and printer. The user can enter commands to align the return distribution system or select a node and specify control signals to control equipment in the node such as: to turn the reference signal on or off, to turn the laser transmitter on or off, to transmit the status of other equipment in the node, to verify the correct operation of the distribution networks. The display may list available commands, equipment status information relevant for choosing the command of effected by executing such commands, and the status of the reference signals from the nodes.

Other alternatives and advantages of the inventions herein will be disclosed or become obvious to those skilled in the art by studying the detailed description below with reference to the following drawings which illustrate the elements of the appended claims of the inventions.

DETAILED DESCRIPTION OF THE BEST MODE AND SPECIFIC EMBODIMENTS

Figure 1:
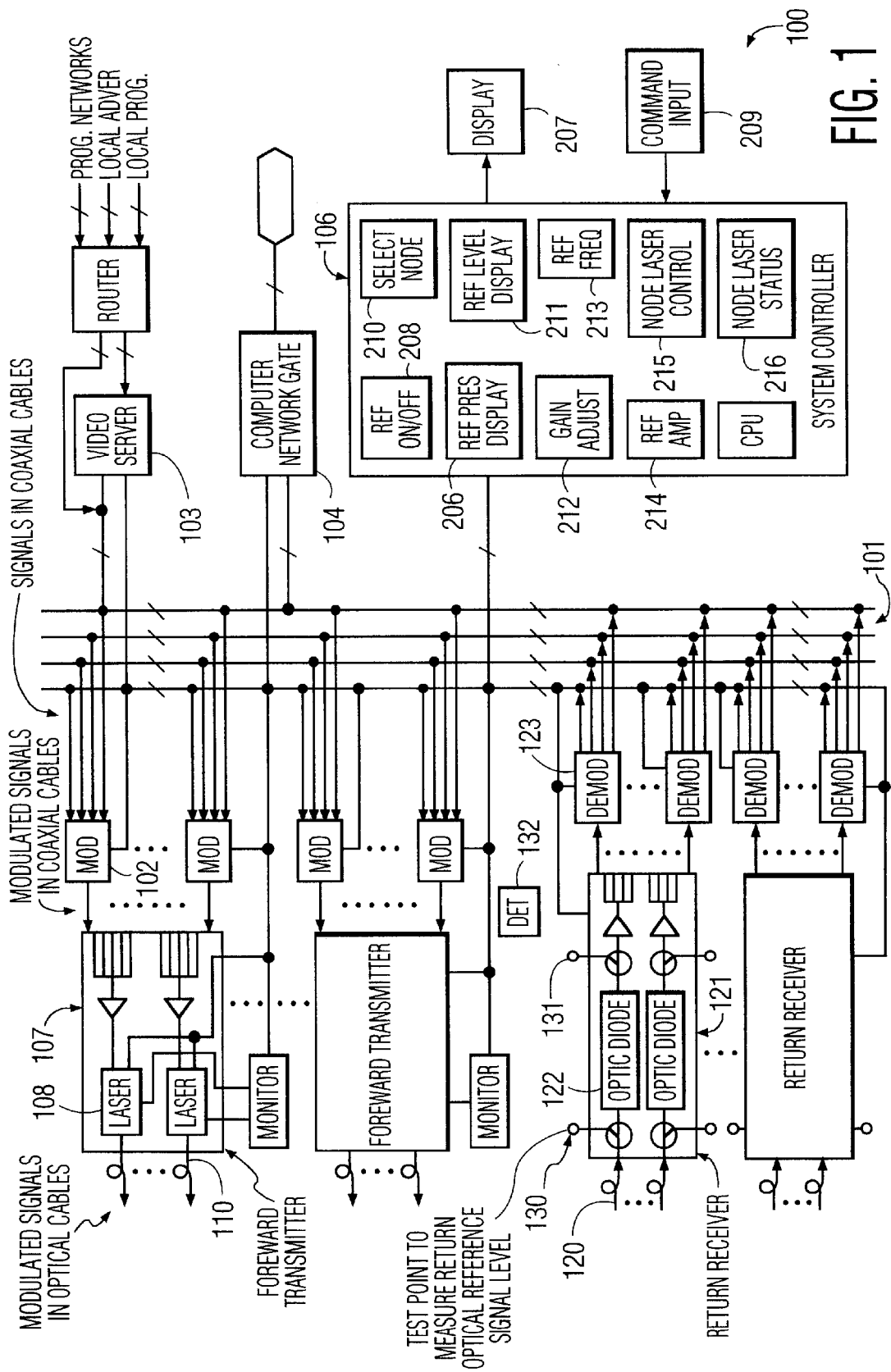
FIG. 1 schematically illustrates some of the equipment of the head-end of the invention including the programmed controller, the receivers, and the transmitters.

FIG. 1 shows selected portions of a head-end 100 of the invention. This particular embodiment uses analog signals, but a similar system could be based on digital signals. A network of electrical communication cables 101 delivers a multitude of data streams from other equipment of the head-end to one or more modulators 102. The streams from the other equipment of the head-end may include television and radio programs from a video server 103, telephone data from a telephone system gateway 104, computer data from computer network gateway 105, and equipment control commands from a system controller 106 at the head-end.

The modulators modulate each stream input to a modulator, at a different frequency, and combine the streams into one stream that is output from the modulator. The number of modulators will depend on how many channels each modulator can handle and how many channels are required. These modulators are often called MODEMS (modulator/demodulators) even though they only modulate.

The streams are routed through coaxial cables from the modulators to one or more forward transmitters 107 which combine one or more modulated streams into one stream for each of, one or more laser transmitters 108. The laser transmitters are modulated by the modulated electrical signals to produce a modulated optical signal that is directed into the end of an optical fiber 110. Each laser transmitter transmits an optical information signal through an optical fiber of a forward optical network tree to the nodes (not shown) of the network.

Modern cable television systems tend to have multiple laser transmitters at the head-end for multi-casting, redundancy, and data communications. In multi-casting different regions or types of customers can receive different television programs and/or different advertisements so that multiple laser transmitters are usually required. In addition, duel optical links (transmitter, cable, receiver) are sometimes used to extend the length through which a signal can be transmitted through the optical cables. A single optical cable is able to handle a large number of data channels, in addition to a large number of television program channels. However, each node typically provides signals for up to 500 customers, so that each node (or a few nodes) may require its own optical cable links for forward data and another optical cable for return data (e.g. telephone and computer data). Since a cable system may have hundreds or even thousands of nodes a large number of laser transmitters and optical receivers may be required at the head-end.

Return signals from the nodes (not shown) are transmitted through optical fibers 120 of a return optical network to one or more return receivers 121 connected to the return network. Each return receiver contains one or more optical detectors 122. The electrical current of the optical detector is modulated by the optical signal to convert the optical signal into an electrical signal. The return signal from each optical detector is divided into one or more separate signals which are routed through coaxial cable to respective demodulators 123. Again the demodulators are often called MODEMS even though they only demodulate. The demodulators are connected to the network of coaxial cables 101 and the demodulated signals are transmitted through coaxial cables from the demodulators to other head-end equipment described above.

The nodes (not shown) produce a reference signal which allows the correct operation of the return optical network to be verified. The return receivers include test points 130 for detecting the presence and/or measuring the strength of the optical reference signal. Alternatively or in addition, the receivers included test points 131 for detecting the presence and/or measuring the strength of the electrical reference signal. Using the reference signal measurements, the strength of the signals produced by each of the receivers can adjusted so the strength of the electrical signals provided by the receivers is aligned. The test points may be used in conjunction with mobile equipment 132 for detecting the presence of a signal.

Figure 2:
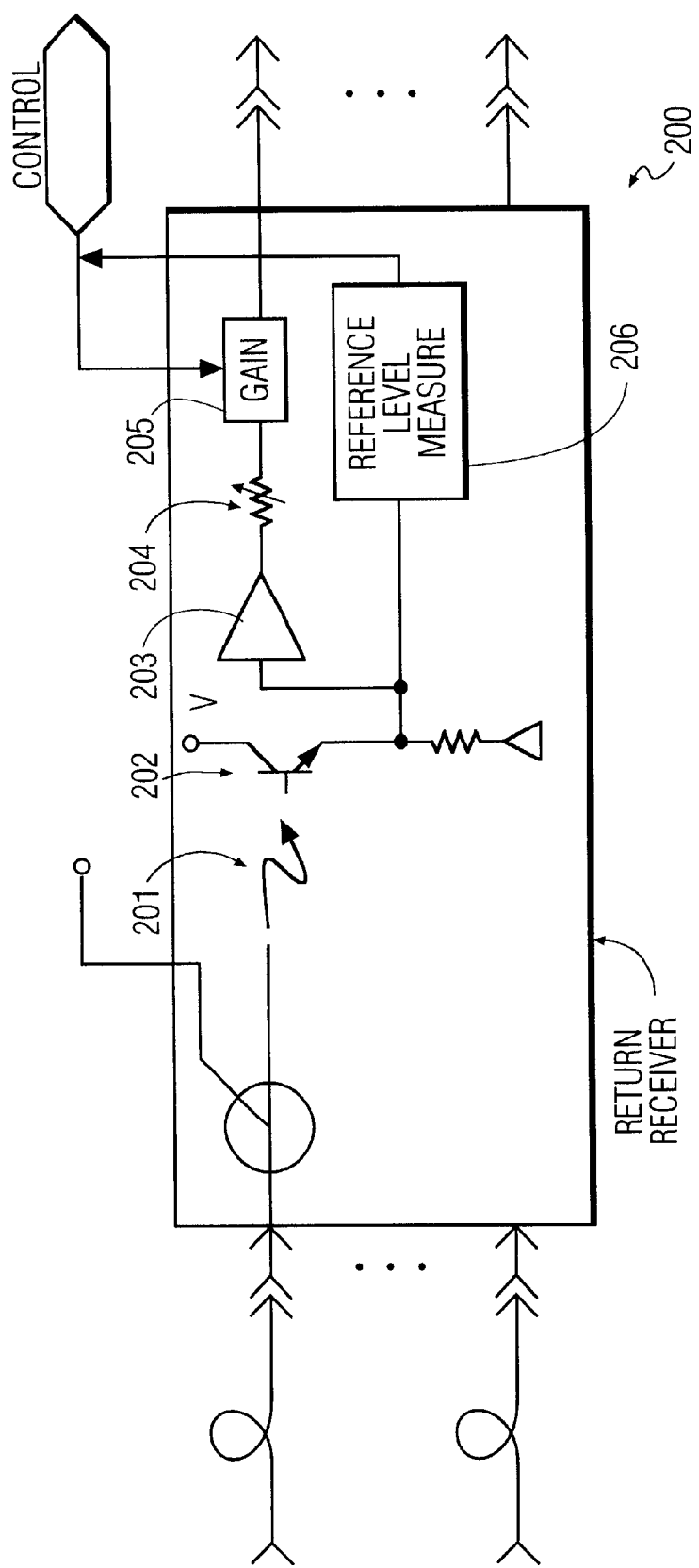
FIG. 2 schematically depicts one of the receivers of the invention of the head-end of FIG. 1.

In FIG. 2 another specific embodiment of portions of a return receiver 200 of the invention is shown. Light 201 emitted from the end of an optical fiber is directed to photo sensor 202 (photo diode or photo resistor, photoelectric transistor) to modulate the electrical current through the optical sensor. The strength of the electrical signal is adjusted by amplifier 203 and the gain of the amplifier is adjusted using variable resistor 204. The gain could also be regulated by using a controllable resistance 205 depending on a control signal from the head-end controller. The reference signal is detected by detector 206 and a presence signal is directed back to the head-end controller. Also, the strength of the reference level and/or the frequency of the reference signal could be measured and a signal indicating the strength and/or frequency of the reference level directed back to the head-end controller.

In FIG. 1, the system controller is connected to the other equipment of the head-end in order to control the system and is connected to provide commands in the forward signal streams in order to send equipment control commands to the nodes (not shown) to control various equipment in the nodes. The head-end controller includes software module 206 for receiving a signal indicating the presence of the reference signal of a node and for displaying that information on a display 207 of a user interface. The head-end controller includes a software module 208 for commanding the nodes to turn the reference signals on or to turn the reference signal off depending on commands from the user input 209 of the user interface. The controller includes software module 210 to receive a command from a human operator to select a node or nodes of the system so that commands to the nodes (such as the command to turn the reference signal on or off) can be addressed or routed to the selected node or nodes.

The head-end controller includes a software module 211 for receiving a signal indicating the strengths (amplitudes) of the reference signals from the nodes and displaying the strengths of the reference signals. Software module 212 could be provided to automatically, or in response to input from a user interface, sends a command to gain regulators 205 of the head-end receivers to regulate the gains to align the return signals from the nodes based on the strength of the reference signals.

Figure 3:
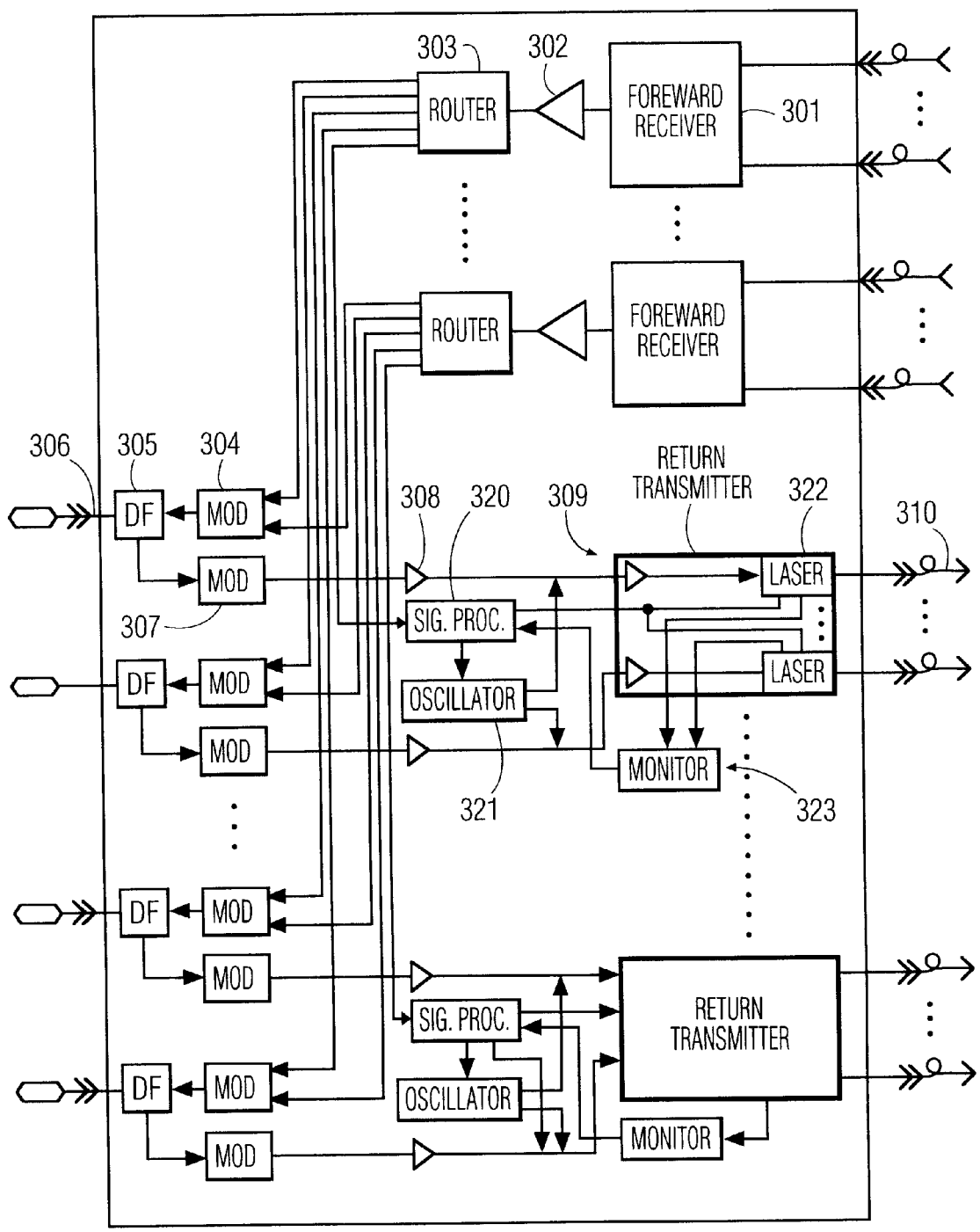
FIG. 3 schematically shows some of the equipment of a node of the invention.

FIG. 3 illustrates a specific embodiment of some of the equipment of a node 300 of the invention. One or more forward receivers 301 convert the forward optical signals from the head-end, into forward electrical signals. The forward receivers are similar to return receivers 121 and 200. The forward electrical signals are amplified at 302 and distributed through routers 303 to selected coaxial network trees 306. Modulators 304 may be provided to remodulate some of the channels of the forward signal streams to different frequencies depending on which signals need to be sent to which network trees. The forward signal is transmitted through diplex filters 305 to customer coaxial network trees 306. The customer networks connect between the node and the CIUs described below. Return signals from the CIUs are separated from the forward signals by the diplex filters. Modulators 307 may be provided to remodulate the return signals to different frequencies so they can be combined into fewer return streams. The return signals are amplified by amplifiers 308 and transmitted by return transmitter 309 (similar to forward transmitter 107). The transmitter converts the return electrical signals to optical signals which are transmitted back to the head-end through cables 310 of the return optical network.

In this specific embodiment, one or more signal processors 320 receive forward electrical signals from the forward network through routers 303. The signal processors detect equipment control signals in the forward signals and in response, transmit control signals to the other equipment of the node including reference oscillator 321 and one or more lasers 322 depending on the control signals from the head-end. The signal processors also receive signals from the laser monitors depending on the status of the laser. The signal processor is also connected to introduce equipment status signals into the electrical signal return stream to transmit the status signals to the head-end.

Figure 4:
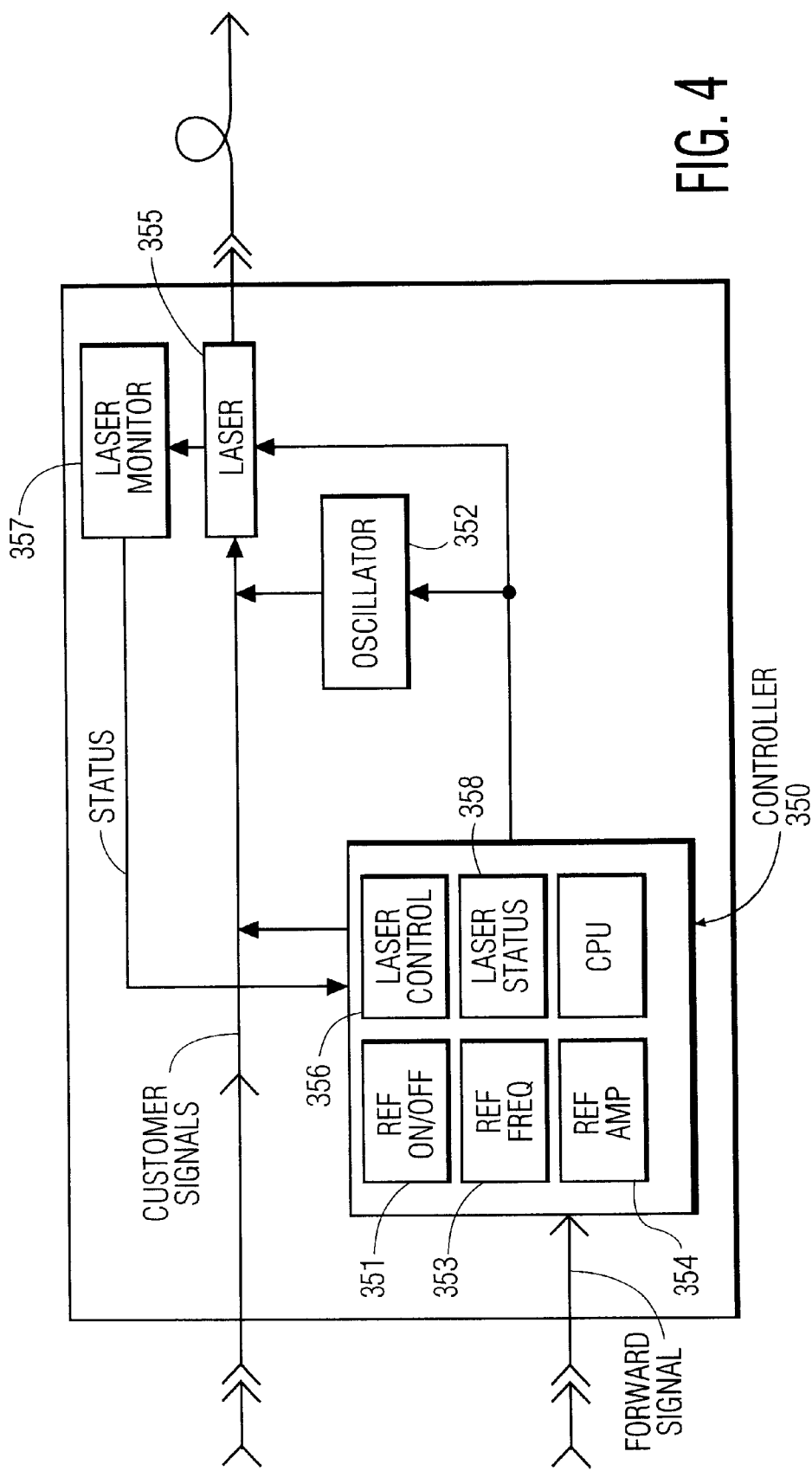
FIG. 4 illustrates selected portions of another embodiment of the node of the invention including details of the controller.
Figure 5:
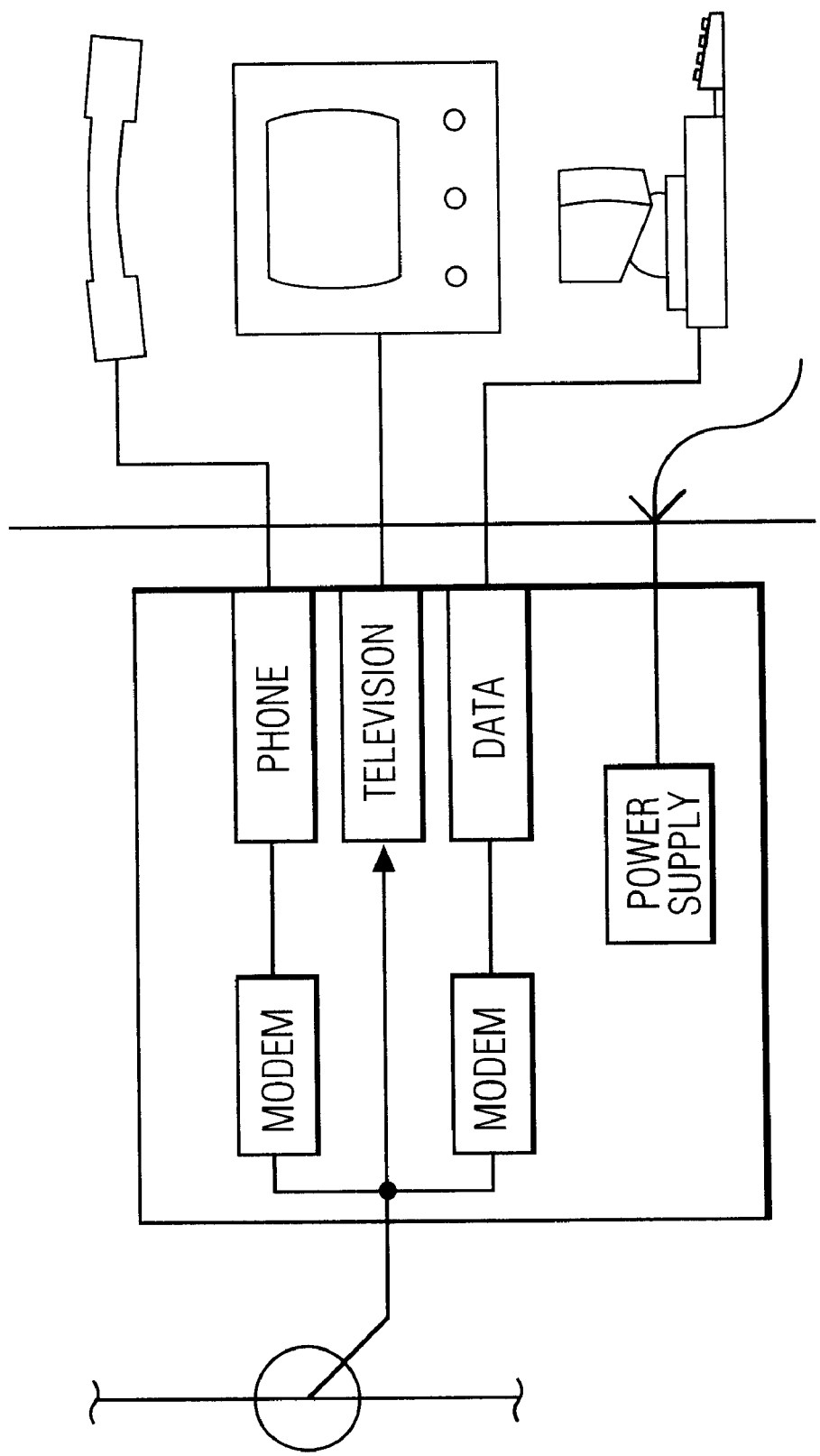
FIG. 5 is another schematic illustrating a customer interface unit.

FIG. 4 illustrates another embodiment of portions of the node of the invention. Node controller 350 receives electrical forward signals from the head-end through the forward optical network and the receivers of the node as in the embodiment of FIG. 3 discussed above. The forward signals include equipment control signals for controlling the node equipment. The node controller includes software modules which detect the equipment control signals from the head-end and provide equipment control signals for the equipment of the node depending on the control signals received from the head-end. The equipment control signals may be addressed to specific nodes and the controller identifies the signals that are addressed to the respective node.

In node controller 350, software module 351 identifies a control signal from the head-end to turn the reference oscillator on or off and operates to transmit the signal to the reference oscillator. Head-end controller 106 in FIG. 1 could include software module 213 which would provide an equipment control signal to adjust the frequency of the reference signal produced by reference oscillator 352 and software module 353 of node controller 350 could identify the signal in the forward data stream and provide a signal to the oscillator to change the frequency of the oscillator. Similarly, head-end controller 106 could include software module 214 which would provide a signal to adjust the amplitude of the reference signal produced by the reference oscillator and software module 354 of controller 350 could be provided to identify such signal and provides a signal to the oscillator circuit to change the amplitude of the reference signal. The system thus could include apparatus to change the amplitude of the reference signal with respect to other portions of the return signal and also to change the strength of the return signal using gain control 205 to align the return signal with the return signal from other nodes.

Head-end controller 106 also includes software module 215 for providing signals to control the laser transmitter 355 of the nodes. For example, laser control module 215 could provide signals to turn the laser transmitter on or off, adjust the bias current through the laser, and adjust the laser power. The node controller includes software module 356 to identify the laser control commands and rout the commands to the laser. The nodes include a laser monitor 357 for each laser or transmitter for detecting the status of the laser such as the laser bias current, the laser power, and whether the laser is on or off and providing laser status signals to the node controller. The node controller 350 includes software module 358 to identify the laser status signals and to transmit the laser status signals back to the head-end. The head-end controller includes software module 216 for identifying the laser status signals and displaying the status of the laser on the display of the user interface.

Figure 6:
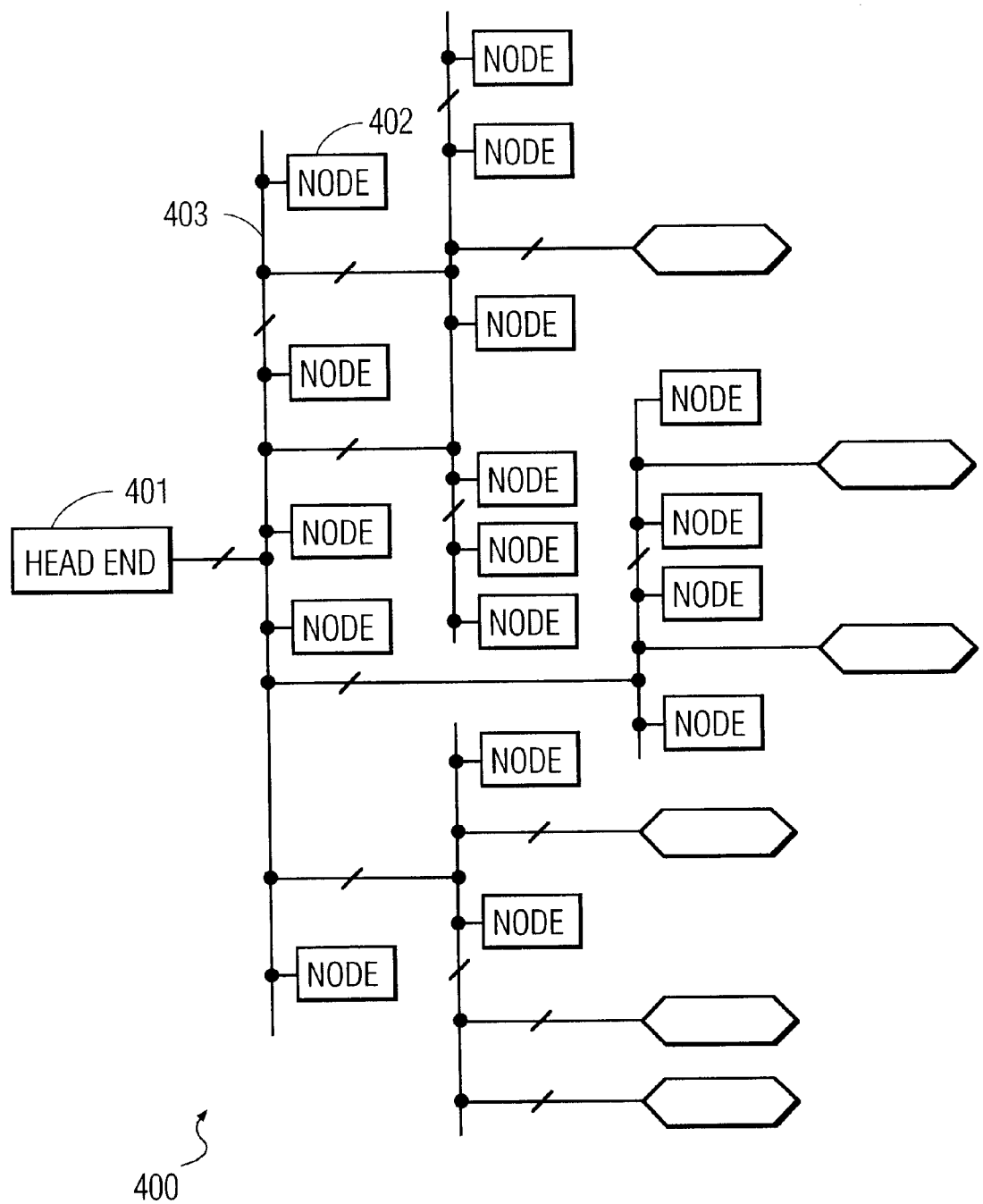
FIG. 6 generally illustrates a portion of an embodiment of the complex optical network or tree of the invention.
Figure 7:
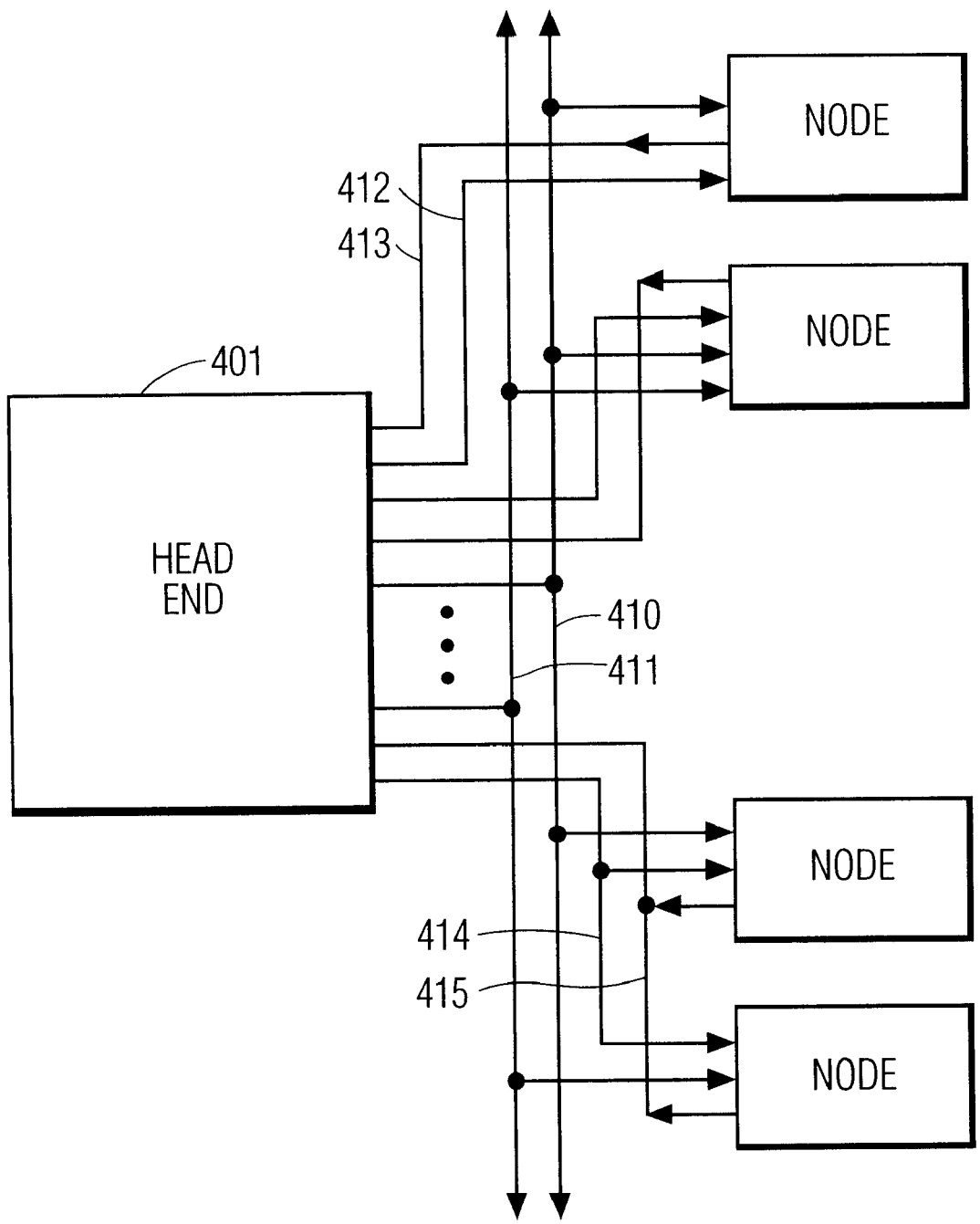
FIG. 7 more specifically illustrates a portions of the forward optical network and the return optical network of the invention.

FIG. 6 is an overall general schematic of the system of the invention in which a head-end 401 communicates with a multitude of nodes 402 through optical fiber cables 403. The cables include multiple optical fibers including different fibers (not shown) for carrying signals in the forward and return directions. FIG. 7 shows more details of the optical fiber cables in which some fibers such as fiber 410 transmit signals from head-end 401 to a first set of multiple nodes and other fibers such as fiber 411 transmits signals from the head-end to a second set of multiple nodes which second set may include some nodes in common with the first set of nodes and may include other nodes which are not in common with the first set of nodes. Fibers connected to a multitude of nodes primarily carry television and radio broadcasts. Other fibers such as fiber 412 transmit signals from the head-end to a single node or such as fiber 413 transmit signals from a single node to the head-end. Fibers connected to a single node primarily carry private data such as telephone and computer data or private television programs such uplinks of television programming or television on-demand signals. Some optic fiber such as fiber 414 transmit data from the head-end to a small number of nodes and fiber 415 receives data from a small number of nodes into the head-end. Fibers connected to a small number of nodes also carry private data to nodes that have less demand for such data so that several nodes can share one optical data path. A typical system would include many form fibers, but the number has been limited for illustrative purposes.

Figure 8:
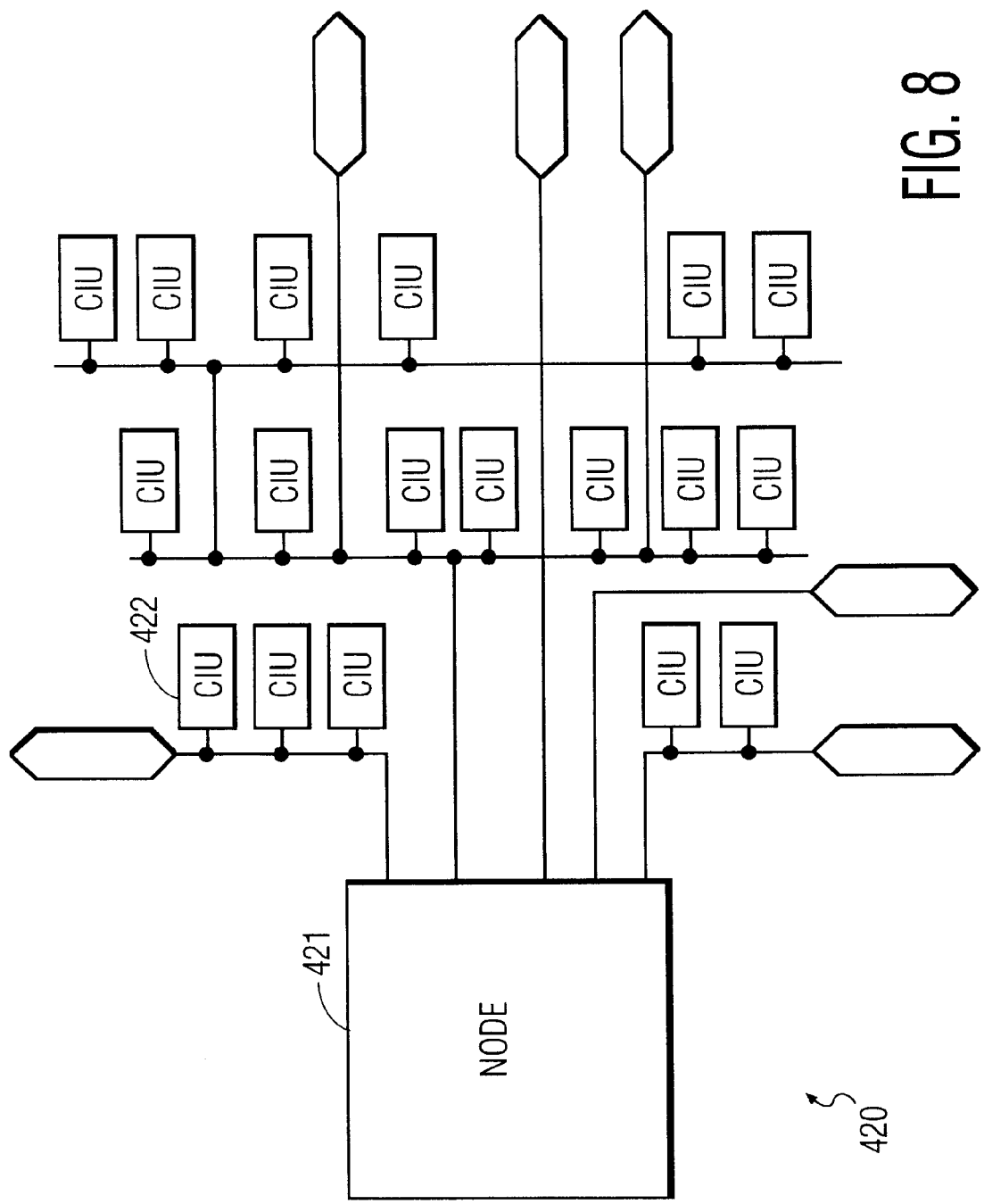
FIG. 8 illustrates a small portion of the coaxial network connecting between the node of FIG. 3 and the customer interface units of FIG. 5.

FIG. 8 illustrates a coaxial cable network 420 including node 421 and a multitude of CIUs 422. One of more coaxial cables 423 connect between the node and a respective set of CIUs. Currently, each CIU only connects to a single cable. The cables carry both private data and public data and the public data such as television and radio programs may be different for different cables. For example one cable tree may be connected to CIUs in an apartment complex and another might be connected to houses in a neighborhood and a third might be connected to a school and each cable tree deliver different programming.

Figure 9:
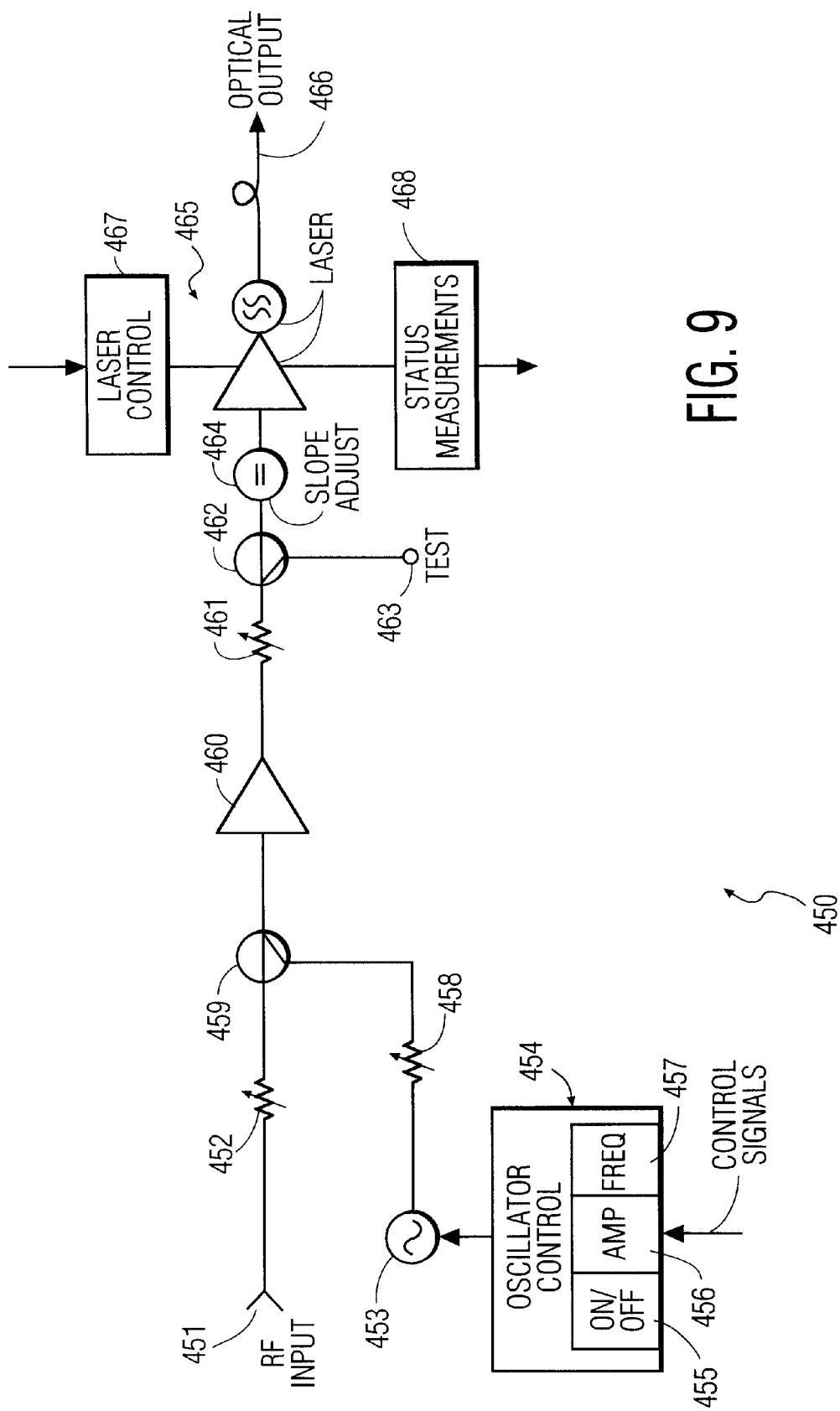
FIG. 9 schematically shows selected details of the laser transmitter of the node in the invention.

FIG. 9 illustrates another specific embodiment 450 including some of the relevant portions of the node of the invention. An electrical return signal is received from the customer interface units at 451. The signal travels through an operator gain adjust 452 which allows the human operator of the system to manually set the circuit for the correct gain according to specifications for the circuit when the node is initially installed. A reference signal oscillator 453 provides a reference signal depending on a control signal input to an oscillator control circuit 454. The control circuit includes circuitry 455 to allow the oscillator to be turned on or off remotely from the head end, and preferably includes circuitry 456 to allow the amplitude of the reference signal to be remotely controlled from the head end and circuitry 457 to allow the frequency of the oscillator to be remotely controlled from the head end. The gain of the reference signal may be adjusted by variable resistor 458. The customer return signal and the reference signal are mixed by coupler 459 so that the reference signal is provided to the head-end so that the return signals to the head-end can be aligned, the network connection between the node and the head-end can be tested, and the operation of the node can be monitored at the head-end.

The combined return signal is amplified by amplifier 460. Preferably the amplifier includes a mimic circuit amplifier and a hybrid circuit amplifier (not shown). The gain of the circuit is set at the factory using variable resistor 461. Another coupler 462 provides a signal to a test point 463. At the factory a test signal may be applied to the customer signal input and the reference oscillator operated and the test point can be used for measuring the amplitude of the reference signal as variable resistors 455 and 461 are adjusted. Also, later during installation, the operator can use the test point for adjusting gain 452 depending on the strength of the input customer signal. The slope of the combined return signal is adjusted at the factory using slope adjust 464. The radio frequency (RF) electrical signal is used to modulate laser 465 to provide an optical signal in optical fiber 466.

A laser control circuit 467 allows the laser to be started or shut down remotely from the head end. Preferably the laser power and bias current can also be remotely adjusted. A laser status measurement circuit 468 measures laser operation parameters including whether the laser is operating, its output power and its bias current.

Figure 10:
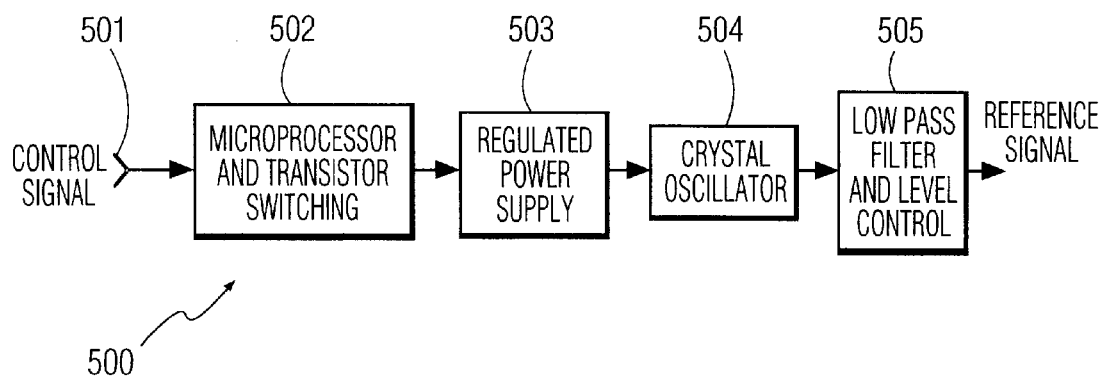
FIGS. 10 and 11 illustrate some details of an embodiment of the reference oscillator circuit of the invention.
Figure 11:
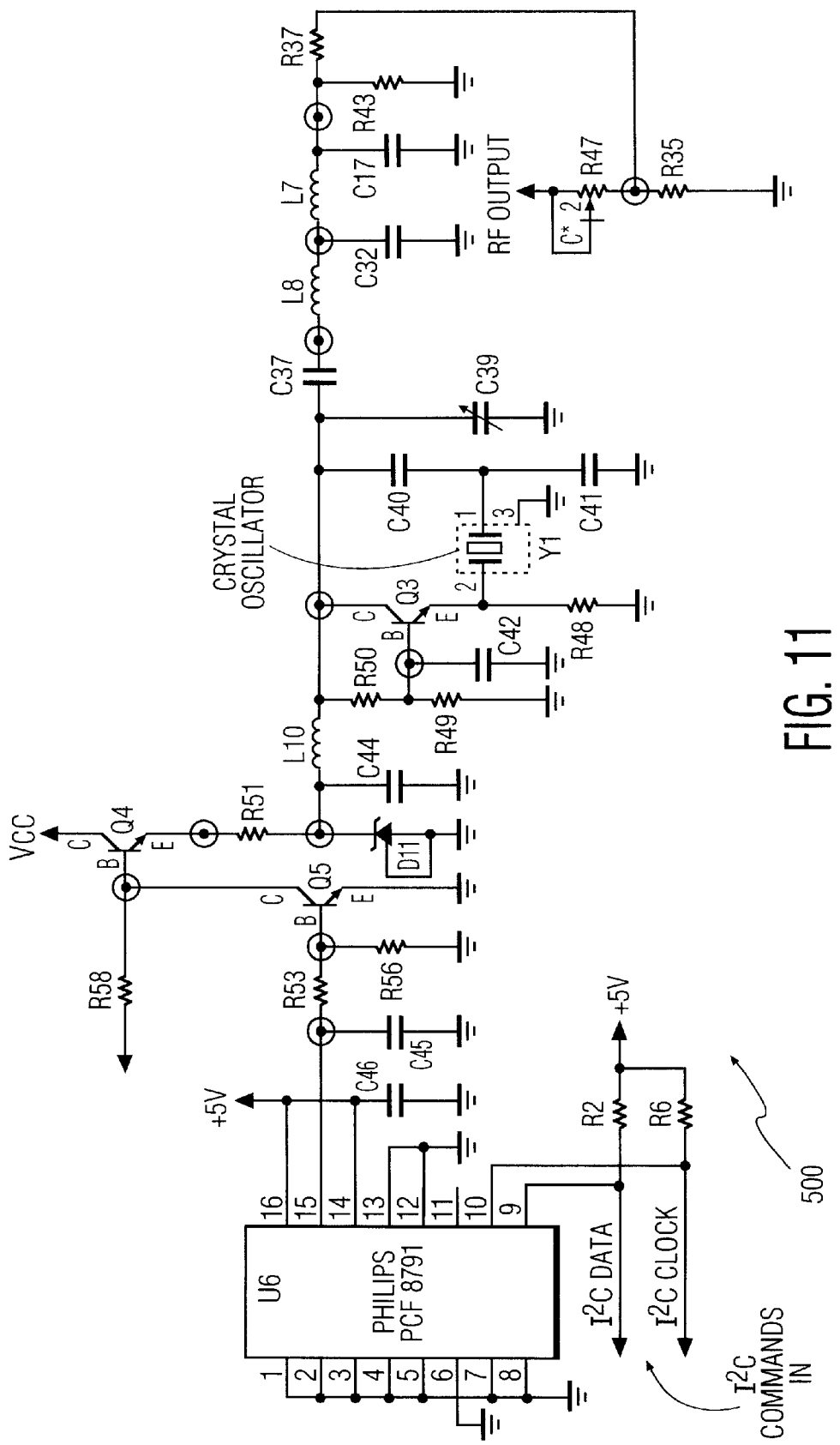

FIGS. 10 and 11 illustrate details of reference generator or oscillator circuit 500 for producing a return reference signal. Commands to turn the turn the reference signal on or off are received at command input 501. In FIG. 11 these signals are carried in a Philips I$^2$C bus. The microprocessor and transistor switching circuit 502 consists of U6 (Philips Semiconductor's PCF8591), Q4 and Q5 (switching transistors), capacitor C46, and resistors R2, R6, R53, and R56. Those skilled in the art can easily determine adequate capacitance and resistance values. Signals received by U6 from the I$^2$C control bus are interpreted as a "leave on" or a "turn off" command. The process output of U6 is routed to the switching transistors to turn the oscillator off or leave it on.

The regulated power supply circuit 503 consists of capacitor C44, zener diode D11, and resistor R51. When the leave on command is received then Q4 connects Vcc with the power supply.

The crystal oscillator circuit 504 consists of an LC tank circuit, a crystal, and an amplifier. The LC tank circuit blocks the unwanted lower harmonics generated by the fundamental frequency of crystal Y1 from the oscillator's output. The tank circuit consists of inductor L10 and capacitors C40 and C41. The oscillator's frequency depends on the values of L10, C40, C41 and Y1 and the output frequency is determined by selecting these values. The amplifier circuit amplifies the tone generated by the LC tank circuit in combination with the crystal. The amplifier circuit consists of: resistors R48, R49, and R50; capacitor C42; and transistor Q3. Capacitor C37 acts as a DC blocking capacitor and provides the oscillating signal from the oscillator circuit into the lowpass-filter and level control circuit 505.

The lowpass filter consists of: inductors L7 and L8; capacitors C17 and C32; and variable capacitor C39. Inductors L7 and L8 and capacitors C17 and C32 attenuate unwanted upper harmonics, and the filter can be optimized using variable capacitor L39. The adjustable level control circuit consists of: resistors R35, R37, R43; and variable resistor R47. The adjustable level control allows for an impedance-matched variable attenuation at the reference generator's output.

The best mode for making and using the invention has been described and the invention has been described with reference to specific embodiments with sufficient detail to enable any person of ordinary skill in the art to make and use the invention. Those skilled in the art may modify these embodiments or provide new embodiments within the spirit of the invention, and thus, the description does not limit the present invention to the disclosed embodiments. The invention is limited only by the following appended claims.

We claim:

1. A cable television system, comprising:

head-end equipment including: forward means for providing multiple streams of electrical data signals including television signals and telephone signals from a telephone system, combining the multiple streams into a smaller number of at least one forward stream of electrical data signals, converting the forward stream of electrical signals into a forward stream of optical signals and transmitting the forward optical stream; and return means for receiving at least one return stream of optical data signals including telephone signals and a reference signal, converting the return stream of optical signals into a return stream of electrical signals, amplifying the strength of the electrical return signals, routing the return telephone signals to a telephone system, and detecting the reference signal;

a plurality of nodes including: system means for receiving the combined forward stream of optical signals, converting the forward optical signals into forward electrical signals, amplifying the forward electrical signals, and transmitting the forward electrical signals; and return means for receiving one of more return streams of electrical data signals from customers, amplifying the return electrical signals, generating a return reference signal, combining the return reference signal with the customer return signals, converting the electrical return signals into optical return signals; and means for transmitting the optical return signals;

a forward optical fiber network for distributing the optical signals transmitted from the head-ends to the nodes;

a return optical fiber network for collecting the return optical signals transmitted from the nodes into the head-end; and a plurality of customer interface units for receiving the forward electronic signals from the nodes and transmitting the return electrical signals to the nodes; and a coaxial cable network for distributing the forward electronic signals transmitted from the nodes to the customer interface units and for returning the customer return signals transmitted from the customer interface units to the nodes.

2. The system of claim 1, in which:

the head-end equipment includes control signal means for generating a reference control signal and means for combining the reference control signal into the forward signals for distributing the reference control signal to the nodes; and the nodes further include reference control means for controlling the generating of the return reference signal depending on the reference control signal.

3. The system of claim 2, in which:

the control signal means include activation control means for providing signals to control toggling the reference signal generation on and off, and the reference control means include means for toggling the reference signal generation on and off depending on the activation control signals.

4. The system of claim 3, in which:

the control signal means include frequency control means for providing signals to control the frequency of the transmitted reference signal, and the reference control means include means for controlling the frequency of the reference signal depending on the frequency control signals.

5. The system of claim 3, in which:

the control signal means include amplitude control means for providing signals to control the amplitude of the transmitted reference signal, and the reference control means include means for controlling the amplitude of the reference signal depending on the amplitude control signals.

6. The system of claim 3, in which:

the return means includes means for automatically monitoring the return reference signal for verifying the operation of the return distribution system.

7. The system of claim 3, in which:

the control signal means includes means for selectively addressing individual nodes of the distribution systems to control the generation of the reference control signals differently at different nodes.

8. The system of claim 7, in which:

the head-end equipment includes means for selecting one of the nodes; the control signal means includes means to signal the selected node to modifying the reference signal; and the return means includes means for detecting the modification of the reference signal so as to verify that the forward and return networks are both functioning correctly for that node.

9. The system of claim 1, in which the forward and return electrical and optical signals include modulated radio-frequency analog signals;

the forward means of the head-end include multiple optical transmitters and the nodes include multiple optical receivers;

the nodes include multiple optical transmitters each with a respective oscillator for producing a respective reference signal and each with a respective controller for controlling the oscillator depending on respective reference control signals;

the head-end forward means is adapted for each transmitter, to modulate each of the multiple streams of electrical signals at a different frequency and to combine the streams of different frequency to provide the combined electrical stream;

at least one node includes multiple optical receivers and is connectable to multiple coaxial cable networks and includes a router for routing telephone data streams in the combined data stream to a selected one of the coaxial cable networks connected to the node;

a node includes means to re-modulate a telephone stream to a selected frequency.

10. A cable television head-end, comprising:

means for receiving multiple streams of electrical data signals;

means for combining the multiple data streams into fewer streams including at least one forward stream of electrical signals;

means for converting the electrical forward data stream into a forward optical signal and transmitting the forward optical signal;

means for receiving an optical return signal including a reference signal;

means for converting the optical return signal into a return stream of electrical signals;

means for amplifying the strength of the electrical return signals; and means for detecting the presence of the reference signal in the return signal.

11. The head-end of claim 6, further comprising:
multiple receivers for receiving respective optical return signals including a reference signal and for converting the optical signals into electrical return signals;
means for measuring the signal level of the reference signal for each receiver;
means for adjusting the level of the return signals in order to align the level of the reference signals in the return system.

12. A node in a cable television distribution system, comprising:
means for receiving at least one forward optical data stream;
means for converting the optical forward signal stream into electrical signals;
means for amplifying the forward electrical signals;
means for transmitting the forward electrical signals;
means for receiving electrical customer return signals;
means for amplifying the electrical return signals;
means for generating a return reference signal;
means for combining the return reference signal with the customer return signals;
means for converting the electrical return signals into optical return signals; and
means for transmitting the optical return signals onto an optical return signal distribution system.

13. A return signal circuit, comprising:
means for receiving control signals;
means for receiving electrical customer data signals;
means for amplifying the customer data signals;
means for modulating the customer signals with a selected carrier frequency;
means for generating an electrical reference signal depending on the control signals;
means for combining the electrical customer signals with the electrical reference signal into a return signal;
means for converting the electrical return signal into optical return signal.

14. A node for a cable television distribution system, comprising:
an optical receiver circuit for receiving a forward optical signal and converting the optical signal into an forward electrical signal;
a connection for receiving electrical return signals from customers;
an optical transmitter circuit, including: a laser modulated by the electrical return signal for converting the electrical return signal into an optical return signal depending on laser control signals; an oscillator circuit for producing an electrical reference signal depending on reference control signals; means for combining the electrical reference signal into the electrical return signal before converting the return signal from an electrical signal into an optical return signal; and a monitor circuit for producing electrical status signals;
a signal processor including: a circuit for extracting the control signals from the forward electrical signals; a circuit for transmitting respective control signals to the laser and the oscillator circuit; and a circuit for modulating the status signals at a selected frequency;
means for combining the modulated electrical status signals into the electrical customer return signals to produce the electrical return signal.

15. The node of claim 14, in which:
the node further comprises optical connectors for attaching an optical cable to receive the forward optical signal and a plurality of electrical connectors for attaching coaxial cables for transmitting the forward electrical signals and for receiving electrical return signals from the customers; and a respective separator for filtering customer return signals from the forward electrical signal; a modulator for re-modulating the return signals from each attached coaxial cable at a different frequency;
the extracting circuit is adapted to extract from the forward signal: control signals for toggling the return reference signal on and off, control signals for changing the frequency of the reference signal, and a control signals for changing the amplitude of the reference signal.

16. A head-end for communicating with distribution nodes, comprising:
a computer system including: a user interface; at least one output port; at least one input port; a processing unit communicating with the terminal and ports; electronic memory communicating with the processing unit and programmed to provide apparatus, including: means for receiving and displaying status information for respective nodes, received through the input port; means to allow a human operator to select a node and to input commands for the node including commands to toggle the reference signal for the selected node between on and off; means to transmit command signals through the output ports; means to receive status information through the input ports; means to display the status information to the human operator;
one or more transmitters communicating with respective computer output ports and including: means for receiving multiple electrical signals including the control signals; means for combining the different signals into an electrical forward distribution signal; and a laser for converting the electrical forward signal into an optical forward signal;
a plurality of receivers communicating with one or more of the computer input ports and including: means for receiving an optical return signal; means for detecting the presence and measuring the amplitude of an optical reference signal embedded in the return signal for aligning the receivers; means for converting the optical return signal into an electrical return signal including status signals and including a signal indicating the presence of each respective reference signal of each node.

17. The head-end of claim 16, in which:
the transmitters are connected to one or more computer output ports through a respective modulator for each output port and/or for each transmitter;
the receivers are connected to one or more computer input ports through a respective demodulator for each input port and/or for each receiver;
the head-end further comprises means for providing signals indicating the frequency and amplitude of the reference signals;
the status signals for each node, include signals indicating: the bias current of the laser, the optical output power of the laser, the amplitude of the reference signal, the frequency of the reference signal, and the operation of the transmitter of the node;
the commands further include: commands to toggle the transmitter of the selected node between on and off, commands to select the amplitude of the reference signal, and commands to select the frequency of the reference signal.

18. A transmitter circuit for a node of a cable television system, comprising:

one or more coaxial cable inputs for electrical customer return signals;

an oscillator for generating an electrical reference signal;

an input for reference control signals including a signal to toggle the reference oscillator between on and off and for laser control signals including a signal to turn the laser on and off;

a coupler for combining the reference signal into the customer return signals to provide an electrical return signal;

an amplifier for increasing the level of the electrical return signal;

a laser for converting the amplified electrical return signal into an optical return signal;

an optical cable output connection for the optical return signal.

19. The transmitter circuit of claim 18, in which:

the circuit further comprises a gain adjust for each customer signal input;

the circuit further comprises a gain adjust for the reference signal;

the circuit further comprises a gain adjust for the amplified return signal to provide the correct signal level to the laser;

the circuit further comprises a slope adjust for the amplified return signal;

the circuit further comprises one or more monitors for generating the status signals including status signals for optical power output and laser bias current and another coupler for combining the status signals into the return signal; and the input for reference control signals is adapted for receiving a signal to adjust the frequency of the reference oscillator and a signal to adjust the amplitude of the reference signal.

* * * * *